US012592418B1

(12) United States Patent
Lee et al.

(10) Patent No.: US 12,592,418 B1
(45) Date of Patent: Mar. 31, 2026

(54) STRUCTURE AND MATERIALS OF TAPES FOR ELECTROCHEMICAL CELLS UTILIZING LIQUEFIED GAS ELECTROLYTES

(71) Applicant: SOUTH 8 TECHNOLOGIES, INC., San Diego, CA (US)

(72) Inventors: Jungwoo Lee, San Diego, CA (US); Jeremy Intrator, San Diego, CA (US); Frederick Krause, Carlsbad, CA (US); Cyrus S. Rustomji, San Diego, CA (US)

(73) Assignee: SOUTH 8 TECHNOLOGIES, INC., San Diego, CA (US)

( * ) Notice: Subject to any disclaimer, the term of this patent is extended or adjusted under 35 U.S.C. 154(b) by 0 days.

(21) Appl. No.: 19/343,047

(22) Filed: Sep. 29, 2025

Related U.S. Application Data

(60) Provisional application No. 63/700,733, filed on Sep. 29, 2024.

(51) Int. Cl.
| | |
|---|---|
| *H01M 10/0569* | (2010.01) |
| *H01M 10/04* | (2006.01) |
| *H01M 10/0567* | (2010.01) |
| *H01M 50/595* | (2021.01) |
| *H01M 10/0525* | (2010.01) |

(52) U.S. Cl.
CPC ... *H01M 10/0569* (2013.01); *H01M 10/0422* (2013.01); *H01M 10/0567* (2013.01); *H01M 50/595* (2021.01); *H01M 10/0525* (2013.01); *H01M 2300/0028* (2013.01)

(58) Field of Classification Search
CPC ......... H01M 10/0569; H01M 10/0422; H01M 10/0567; H01M 10/0525; H01M 50/595; H01M 2300/0028
USPC ........................................................ 429/324
See application file for complete search history.

(56) References Cited

U.S. PATENT DOCUMENTS

| | | | | |
|---|---|---|---|---|
| 2011/0287302 | A1* | 11/2011 | Kim ................... | H01M 50/184 429/163 |
| 2017/0263983 | A1 | 9/2017 | Bao et al. | |
| 2017/0301903 | A1 | 10/2017 | Choi et al. | |
| 2018/0375156 | A1* | 12/2018 | Zhamu ................... | C07C 21/04 |
| 2020/0203703 | A1* | 6/2020 | Royer ................... | H01M 10/63 |
| 2021/0098829 | A1* | 4/2021 | Rustomji ............. | H01M 4/505 |
| 2024/0097182 | A1* | 3/2024 | Kim ................. | H01M 10/0562 |
| 2024/0120543 | A1 | 4/2024 | Rustomji et al. | |

OTHER PUBLICATIONS

International Search Report for PCT/US2025/048373 dated Jan. 8, 2026 (13 Pages).

* cited by examiner

*Primary Examiner* — James M Erwin
(74) *Attorney, Agent, or Firm* — Manuel de la Cerra

(57) ABSTRACT

Electrochemical cells employing liquefied gas electrolytes may experience degradation of certain polymer components, such as tapes made from poly(ethylene terephthalate), poly (butylene terephthalate), or polydimethylsiloxane. These materials exhibit low chemical stability, potentially leading to cell failure. Embodiments disclosed herein utilize stable polymers, including polyimide, polypropylene, or polyethylene as tape carriers and poly(methyl methacrylate) as adhesives, to enhance compatibility and performance in such cells.

28 Claims, 3 Drawing Sheets

STRUCTURE AND MATERIALS OF TAPES FOR ELECTROCHEMICAL CELLS UTILIZING LIQUEFIED GAS ELECTROLYTES

CROSS-REFERENCE TO RELATED APPLICATIONS

This application claims priority to U.S. Patent Application 63/700,733 entitled "Structure and Materials for Electrochemical Cell Utilizing Liquefied Gas Electrolyte" filed on Sep. 29, 2024. The entire contents of this application are incorporated by reference in its entirety.

This application is related to the following applications and patents, each of which is hereby incorporated by reference in its entirety: U.S. Pat. No. 10,608,284, issued Mar. 31, 2020; U.S. Pat. No. 10,998,143, issued May 4, 2021; U.S. Pat. No. 10,784,532, issued Sep. 22, 2020; U.S. Pat. No. 11,088,396, issued Aug. 10, 2021; U.S. Pat. No. 10,873, 070, issued Dec. 22, 2020; U.S. Pat. No. 11,342,615, issued May 24, 2022; U.S. Pat. No. 11,049,668, issued Jun. 29, 2021; U.S. Pat. No. 11,984,614, issued May 14, 2024; U.S. Pat. No. 11,958,679, issued Apr. 16, 2024; PCT/US22/ 31594, filed May 31, 2022; PCT/US23/17720, filed Apr. 6, 2023; PCT/US23/28104, filed Jul. 19, 2023; PCT/US23/ 28105, filed Jul. 19, 2023; PCT/US24/16784, filed Feb. 21, 2024; PCT/US24/18746, filed Mar. 6, 2024; PCT/US24/ 33428, filed Jun. 11, 2024; PCT/US24/25771, filed Apr. 23, 2024; PCT/US24/31912, filed May 31, 2024; U.S. Provisional Application No. 63/534,213, filed Aug. 22, 2023; U.S. Provisional Application No. 63/418,703, filed Oct. 24, 2022; PCT/US24/27501, filed May 2, 2024; PCT/US24/31325, filed May 29, 2024; U.S. Provisional Application No. 63/652,616, filed May 28, 2024; PCT/US24/40203, filed Jul. 30, 2024; U.S. patent application Ser. No. 18/788,809, filed Jul. 30, 2024; U.S. patent application Ser. No. 18/643,134, filed Apr. 23, 2024; U.S. patent application Ser. No. 18/807, 938, filed Aug. 17, 2024; and U.S. Provisional Application No. 63/684,297, filed Aug. 16, 2024.

TECHNICAL FIELD

The present disclosure relates to electrochemical cells, and more particularly to materials for tapes used in electrochemical cells employing liquefied gas electrolytes.

BACKGROUND

Prior art in battery construction includes tapes for securing jelly roll electrode assemblies, such as those disclosed in U.S. Pat. No. 10,833,297, which describes a jelly roll tape with adhesive layers that react with conventional liquid electrolytes to enhance adhesion and prevent movement within the battery case. Similarly, advancements in electrolyte technology have introduced liquefied gas electrolytes (LGEs), as exemplified in WO 2017/204984 A1, which proposes compressed gas solvents like difluoromethane for improved low-temperature performance and higher voltage stability in electrochemical capacitors and batteries.

However, conventional polymers used in battery tapes, such as poly(ethylene terephthalate), exhibit poor compatibility with LGEs due to high solubility in difluoromethane-based solvents, leading to degradation, dissolution, and subsequent loosening of the electrode assembly. This failure mode results in increased impedance, reduced cycle life, and safety hazards, creating unmet needs in applications requiring high-energy-density batteries, such as electric vehicles, where reliable performance across wide temperature ranges is critical.

What is needed, therefore, is a tape that will not degrade when contacted with LGE.

SUMMARY

Electrochemical cells may include various polymer components, such as separators, electrode binders, assembly tapes, tab-insulating tapes, and insulating discs. Examples of such polymers include poly(ethylene terephthalate) (PET), polylactic acid (PLA), poly(ethylene succinate) (PES), polycaprolactone (PCL), polybutylene terephthalate (PBT), polypropylene (PP), polyethylene (PE), polycarbonate (PC), polystyrene (PS), polyamide (PA), polyisobutene (PI), carboxymethylcellulose (CMC), styrene-butadiene rubber (SBR), polytetrafluoroethylene (PTFE), polyvinyl fluoride (PVF), polyvinylidene fluoride (PVDF), silicones such as polydimethylsiloxane (PDMS), acrylate polymers such as poly(methyl methacrylate), and similar compounds.

In conventional liquid electrolyte cells, these polymers generally exhibit compatibility, with no significant degradation or dissolution. In contrast, in cells utilizing liquefied gas electrolytes, certain polymers may dissolve or degrade, leading to loosening of electrode assemblies, increased impedance, reduced performance, chemical interference, and potential safety hazards.

To address these issues, embodiments disclosed herein employ alternative materials for tapes, such as polyimide, polypropylene, or polyethylene as the tape carrier, and poly(methyl methacrylate) as the adhesive, to enhance compatibility and maintain cell integrity in liquefied gas electrolyte environments.

Additional aspects, alternatives, and variations apparent to those skilled in the art are also included within the scope of the present disclosure. The invention is defined by the claims as allowed, and the following descriptions of examples are not intended to limit or define the scope of protection.

BRIEF DESCRIPTION OF THE DRAWINGS

The accompanying drawings, which are incorporated into and constitute a part of this specification, illustrate embodiments of the disclosure and together with the description, serve to explain the principles thereof.

DETAILED DESCRIPTION

Figure 1:
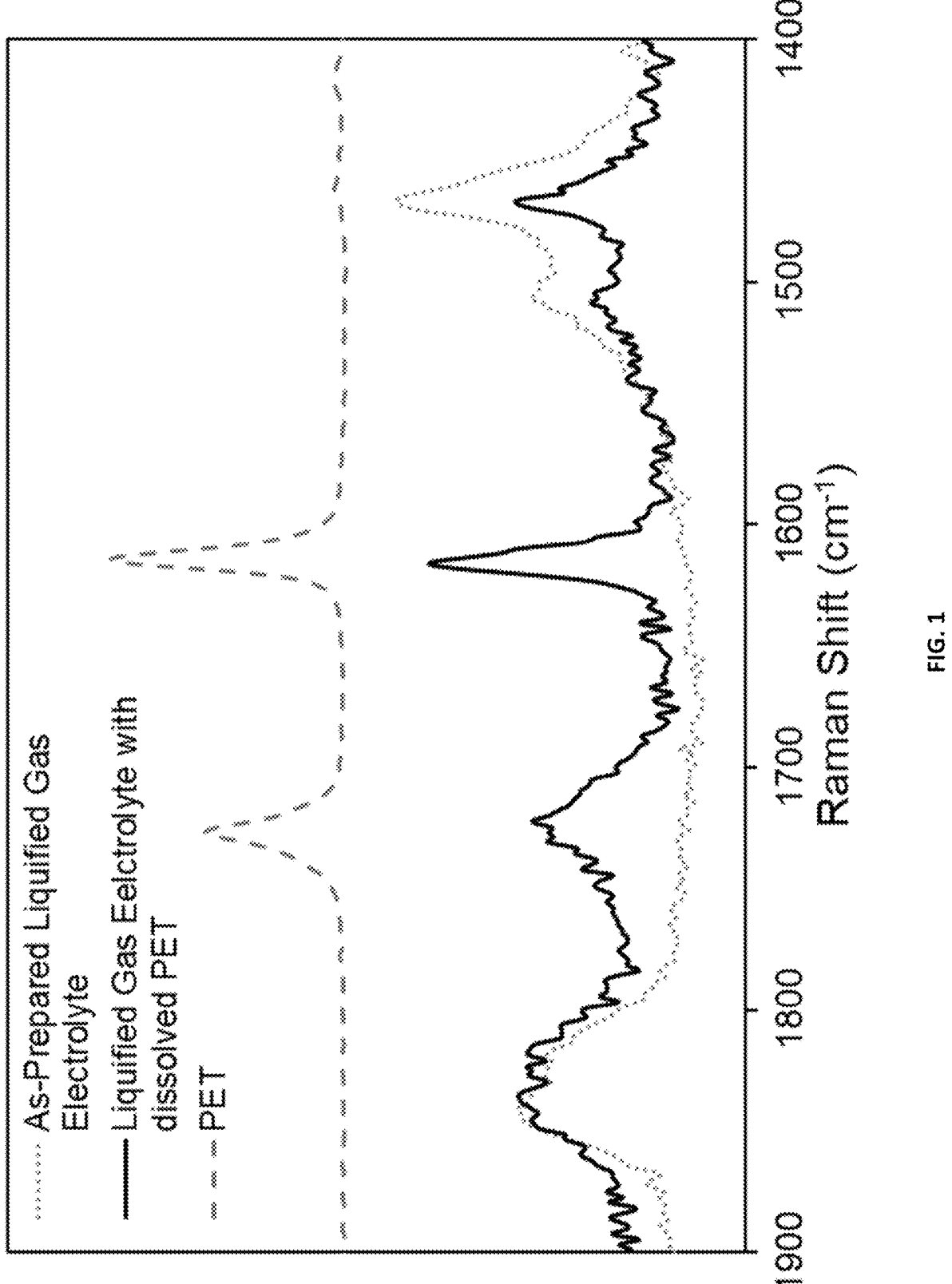
FIG. 1 illustrates a Raman spectrum of a liquefied gas electrolyte with poly(ethylene terephthalate) (PET) as a dissolved solute after soaking a PET sample in the electrolyte for 12 hours at 60° C.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth to provide a thorough understanding of the present invention. Example embodiments of the present invention may be implemented without some or all these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

Conventional electrochemical cells may have any number of polymers including, but not limited to, poly(ethylene terephthalate) PET, polylactic acid (PLA), poly(ethylene succinate) (PES), polycaprolactone (PCL), polybutylene terephthalate (PBT), polypropylene (PP), polyethylene (PE), polycarbonate (PC), polystyrene (PS), polyamide (PA), polyisobutene (PI), carboxymethylcellulose (CMC), styrene-butadiene rubber (SBR), polytetrafluoroethylene (PTFE), polyvinyl fluoride (PVF), polyvinylidene fluoride (PVDF), silicones such as polydimethylsiloxane (PDMS) and similar compounds, acrylic polymers such as poly (methyl methacrylate), polyimide, and similar compounds, or other polymers. These polymers may be incorporated into the battery's electrode coatings, tapes that hold the electrode assembly, tapes that electrically isolate the electrical tabs, or other areas of the cell. Often, these polymers are wetted by the cell electrolyte.

These polymers are generally stable in liquid electrolytes. This means there is no decomposition of the polymer and the polymer does not readily solubilize nor swell in conventional liquid electrolytes.

In contrast, some polymers display significant solubility and swelling in liquefied gas electrolytes, specifically the component materials of the tapes found within the battery. For example, there is evidence of PET and PBT-based polymers dissolution in liquefied gas electrolytes. In one experiment, a sample of PET was placed in liquefied gas electrolyte and allowed to soak for 12 hr at 60° C. FIG. 1 is a Raman spectrum obtained of the electrolyte solution after the soaking period, with the spectrum displaying peaks associated with PET that were not present before soaking, indicating significant dissolution of PET. Similar solubility of PBT was observed in the analogous condition used in the dissolution of PET as well.

Figure 2:
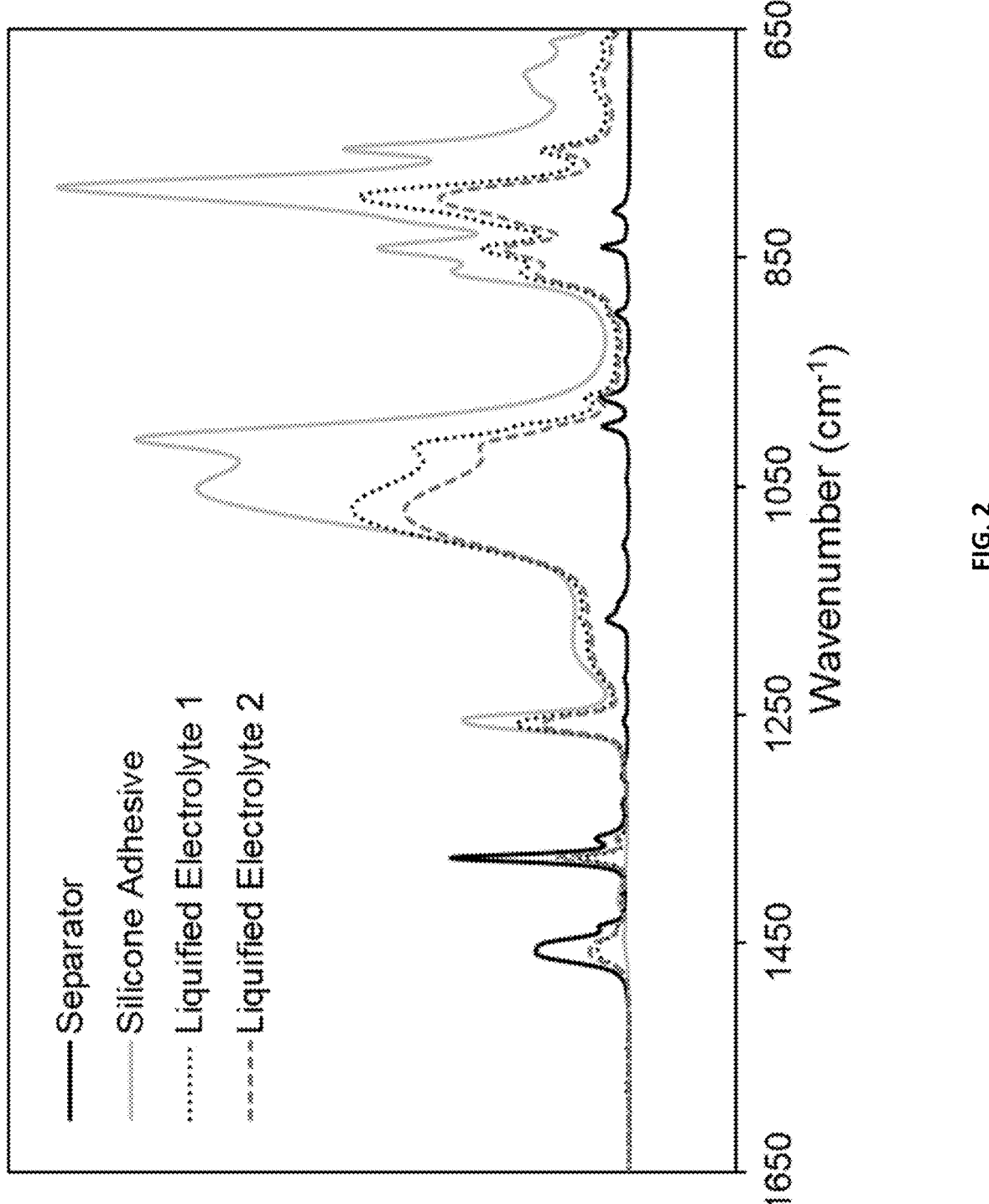
FIG. 2 illustrates an FTIR-ATR spectrum of a polypropylene separator sheet with polyimide tape attached using silicone adhesive. The green and purple traces show results after immersing the tape and separator in two variants of liquefied gas electrolytes and acquiring the spectrum from a section of the sheet apart from the adhered tape after venting the electrolyte. The sample was soaked for 48 hours at 25° C.

Both these polymers are used in many conventional Li-ion battery cell tapes. PET is often found as the carrier material in the tape holding the electrode assembly together or isolating the electrode tabs. Both PET or PBT are also found in electrical isolating plastic components. Another example of an incompatible polymer is silicone, such as poly(dimethylsiloxane) which is often used as adhesives in tape. In one experiment, polyimide tape with silicone adhesive was adhered to a propylene separator sheet and soaked in liquefied gas electrolyte for 48 hours at 25° C. Upon venting the system, silicone adhesive was found to be deposited on parts of the propylene sheet, indicating that the silicone adhesive was partially dissolved and was subsequently deposited on various portions of the sheet upon venting. FIG. 2 is the FTIR-ATR spectrum of a plastic polypropylene separator sheet after soaking in a liquefied gas electrolyte solution containing polyimide tape with silicone adhesive. Silicone adhesive was detected to be present on both separator samples 1 and 2, showing the silicone adhesive is soluble in the liquefied gas electrolytes used.

When using a liquefied gas electrolyte, these polymers may be solubilized into solution and result in diminished cell performance. Other adhesives, such as acrylic-based adhesives, do not show high solubility in liquefied gas electrolytes and would act as a better adhesive for tapes in such applications where exposure to these electrolytes is necessary.

It has been found that there are several suitable polymers which are readily available to replace polymers that are soluble in the liquefied gas electrolyte. One such polymer is polyimide. In multiple experiments, polyimide tape was soaked in different liquefied gas electrolytes with different adhesives. In these cases, while there was evidence that the adhesive had varying amounts of solubility, the polyimide did not show any evidence of solubility in liquefied gas electrolyte.

Figure 3:
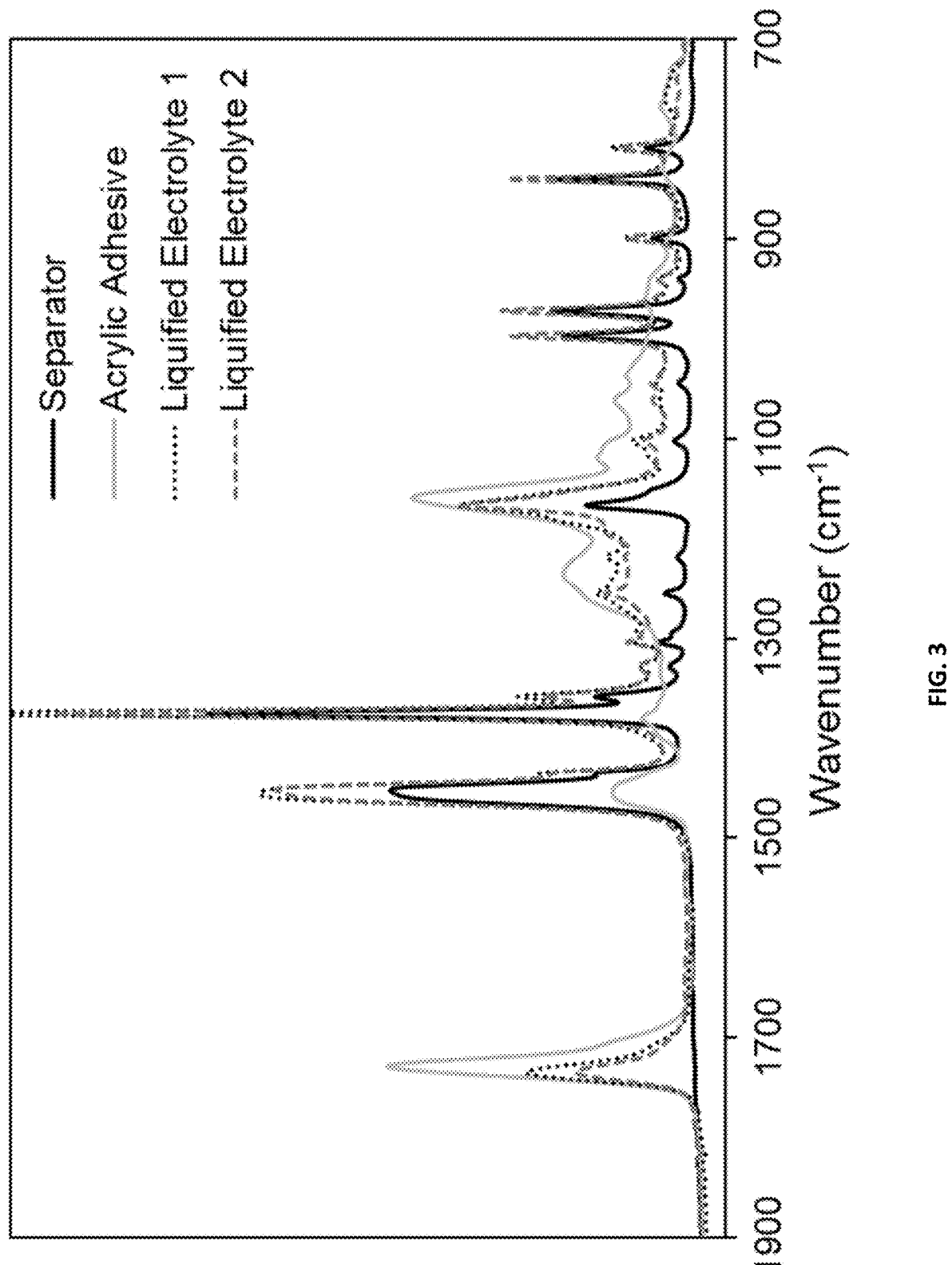
FIG. 3 illustrates an FTIR spectrum of a polypropylene separator sheet with polyimide tape attached using acrylic adhesive, specifically poly(methyl methacrylate). The green and purple traces show results after immersing the tape and separator in two variants of liquefied gas electrolytes and acquiring the spectrum from a section of the sheet apart from the adhered tape after venting the electrolyte. The sample was soaked for 48 hours at 25° C.

It is thus preferred to use polyimide-based polymer as the carrier material for tapes or other plastic materials inside the battery cell. Other suitable carrier material polymers include polyethylene and polypropylene. Typical battery separator materials are composed of these polyethylene and polypropylene and show robust stability in various applications incorporating liquefied gas electrolyte. Other suitable adhesive polymers for tapes include acrylic adhesives, such as poly(methyl methacrylate), which exhibits some degree of solubility in the liquefied gas electrolyte, but significantly less compared to alternatives such as silicone adhesives. FIG. 3 is the FTIR spectrum of a plastic polypropylene separator sheet after soaking in a liquefied gas electrolyte solution containing polyimide tape with acrylic adhesive, specifically poly(methyl methacrylate). The lines labeled as Liquefied Electrolyte 1 and 2 correspond to immersing the tape and separator in two variants of liquefied gas electrolytes and acquiring the spectrum of a section of the plastic sheet apart from the section adhered to the tape after venting the electrolyte. The tape and separator were soaked for 48 hours at 25° C. No appreciable polyimide or acrylic was detected on the separator in either sample 1 or 2 soaking in the liquefied gas electrolyte. Further the tape maintained at least 90% tensile strength after this exposure.

These polymers display sufficient resistance against degradation or dissolution into the liquefied gas electrolyte. Thus, it would be preferable to use these polymers as the component materials of tapes within the electrochemical cell. It is known that polyimide has a higher thermal stability than other polymers such as polyethylene or polypropylene, thus polyimide will retain its mechanical integrity better than these other polymers. In a more preferred embodiment, polyimide would be used as an electrically insulating substrate due to this increased mechanical stability at higher temperatures and to prevent degradation.

While this document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The electrochemical device or battery cell may comprise the ionically conducting liquefied gas electrolyte comprising a mixture of one or more solid or liquid salts, a solution of one or more liquefied gas solvents, and one or more additives, wherein the liquefied gas solvent comprises at least a first component that has a vapor pressure above 100 kPa at a room temperature of 293.15K and the device is housed in an enclosure in which allows the ionically conducting electrolyte to maintain a pressurized condition higher than 100 kPa at 293.15K such that the electrolyte is at least partially in a liquid phase within the cell housing.

In some embodiments, the liquefied gas electrolyte may comprise in part of dimethyl ether, methyl ethyl ether, fluoromethane, difluoromethane, trifluoromethane, fluoroethane, tetrafluoroethane, pentafluoroethane, 1,1-difluoroethane, 1,2-difluoroethane, 1,1,1-trifluoroethane, 1,1,2-trifluoroethane, 1,1,1,2-tetrafluoroethane, 1,1,2,2-tetrafluoroethane, pentafluoroethane, chloromethane, chloroethane, thionyl fluoride, thionyl chloride fluoride, phosphoryl fluoride, phosphoryl chloride fluoride, sulfuryl fluoride, sulfuryl chloride fluoride, 1-fluoropropane, 2-fluoropropane, 1,1-difluoropropane, 1,2-difluoropropane, 2,2-difluoropropane, 1,1,1-trifluoropropane, 1,1,2-trifluoropropane, 1,2,2-trifluoropropane, fluoroethene, cis-1,2-difluoroethene, 1,1-difluoroethene, 1-fluoropropene, propene, chlorine, chloromethane, bromine, iodine, ammonia, methyl amine, dimethyl amine, trimethyl amine, molecular oxygen, molecular nitrogen, carbon monoxide, carbon dioxide, sulfur dioxide, methyl vinyl ether, nitrous oxide, nitrogen dioxide, nitrogen oxide, carbon disulfide, hydrogen fluoride, hydrogen chloride, methane, ethane, propane, n-butane, isobutane, cyclopropane, ethene, propene, butene, cyclobutene, acetylene, 3,3,3-trifluoropropene, 2,3,3,3-tetrafluoropropene, trans-1,3,3,3-tetrafluoropropene, trans-1,1,1,4,4,4-hexafluoro-2-butene, cis-1,1,1,4,4,4-hexafluoro-2-butene, 1,1-difluoroethene, 1,2-difluoroethene, 1,1-dichloroethene, vinyl chloride, vinyl fluoride, hexafluoropropene, hexafluorobutadiene, trichloroethene, dichloroethene, chlorofluoroethene, (Z)-1-chloro-2,3,3,3-tetrafluoropropene, trans-1-chloro-3,3,3-trifluoropropene, 3,3,4,4,4-pentafluoro-1-butene, hydrofluoroolefins (HFOs), hydrochloroolefins (HCOs), hydrochlorofluoroolefins (HCFOs), perfluoroolefins (PFOs), or perchloroolefins (PCOs), perfluoroolefins, methane, ethane, propane, n-butane, iso-butane, cyclopropane, cyclopropane, ethene, propene, butene, cyclobutane, cyclobutene, acetylene, pentane, hexane, heptane, octane, cyclopentane, cyclohexane, cycloheptane, cyclooctane, isomers thereof, or a combination thereof.

In some embodiments, lithium-, sodium-, zinc-, calcium-, magnesium-, aluminum-, or titanium-based salts are used. Further, electrolyte or solvent solution containing one or more liquefied gas solvents may be combined with one or more salts, including one or more of lithium bis(trifluoromethanesulfonyl)imide (LiTFSI), lithium hexafluorophosphate (LiPF$_6$), lithium perchlorate (LiClO$_4$), lithium hexafluoroarsenate (LiAsF$_6$), lithium tetrachloroaluminate (LiAlCl$_4$), lithium tetragaliumaluminate, lithium bis(oxalato) borate (LiBOB), lithium hexafluorostannatc (LiSnF$_4$), lithium difluoro (oxalato) borate (LiDFOB), lithium bis (fluorosulfonyl)imide (LiFSI), lithium aluminum fluoride (LiAlF$_3$), lithium nitrate (LiNO$_3$), lithium trifluoromethanesulfonate, lithium tetrafluoroborate (LiBF$_4$), lithium difluorophosphate, lithium tetrafluoro (oxalato)phosphate, lithium difluorobis(oxalato)phosphate, lithium borate, lithium oxalate, lithium thiocyanate, lithium tetrachlorogallate, lithium chloride, lithium bromide, lithium iodide, lithium carbonate, lithium fluoride, lithium oxide, lithium hydroxide, lithium nitride, lithium superoxide, lithium azide, lithium deltate, dilithium squarate, lithium croconate dihydrate, dilithium rhodizonate, dilithium ketomalonate, lithium diketosuccinate or any corresponding salts with a positively charged sodium or magnesium cation substituted for the lithium cation, or any combinations thereof. Further useful salts include those with positively charged cations such as tetramethylammonium, tetraethylammonium, tetrapropylammonium, tetrabutylammonium, triethylmethylammonium, spiro-(1,1')-bipyrrolidinium, 1,1-dimethylpyrrolidinium, and 1,1-diethylpyrrolidinium, N,N-diethyl-N-methyl-N(2-methoxyethyl) ammonium, N,N-Diethyl-N-methyl-N-propylammonium, N,N-dimethyl-N-ethyl-N-(3-methoxypropyl) ammonium, N,N-Dimethyl-N-ethyl-N-benzylAmmonium, N,N-Dimethyl-N-ethyl-N-phenylethylammonium, N-Ethyl-N,N-dimethyl-N-(2-methoxyethyl) ammonium, N-Tributyl-N-methylammonium, N-Trimethyl-N-hexylammonium, N-Trimethyl-N-butylammonium, N-Trimethyl-N-propylammonium, 1,3-Dimethylimidazolium, 1-(4-Sulfobutyl)-3-methylimidazolium, 1-Allyl-3H-imidazolium, 1-Butyl-3-methylimidazolium, 1-Ethyl-3-methylimidazolium, 1-Hexyl-3-methylimidazolium, 1-Octyl-3-methylimidazolium, 3-Methyl-1-propylimidazolium, H-3-Methylimidazolium, Trihexyl(tetradecyl)phosphonium, N-Butyl-N-methylpiperidinium, N-Propyl-N-methylpiperidinium, 1-Butyl-1-Methylpyrrolidinium, 1-Methyl-1-(2-methoxyethyl) pyrrolidinium, 1-Methyl-1-(3-methoxypropyl) pyrrolidinium, 1-Methyl-1-octylpyrrolidinium, 1-Methyl-1-pentylpyrrolidinium, or N-methylpyrrolidinium paired with negatively charged anions such as acetate, bis(fluorosulfonyl)imide, bis(oxalato)borate, bis(trifluoromethanesulfonyl) imide, bromide, chloride, dicyanamide, diethyl phosphate, hexafluorophosphate, hydrogen sulfate, iodide, methanesulfonate, methyl-phophonate, tetrachloroaluminate, tetrafluoroborate, and trifluoromethanesulfonate. Alternative or additional embodiments described herein provide an electrolyte composition comprising one or more of the features of the foregoing description or of any description elsewhere herein.

In some embodiments the liquefied gas electrolyte may comprise an additive such as a non-cyclic carbonate, cyclic carbonate, ether, cyclic-ether, nitrile, or an organophosphate containing compound. These additives may include dimethyl carbonate, ethyl methyl carbonate, propyl methyl carbonate, butyl methyl carbonate, diethyl carbonate, propyl ethyl carbonate, butyl ethyl carbonate, dipropyl carbonate, propyl butyl carbonate, dibutyl carbonate, fluoromethyl methyl carbonate, difluoromethyl methyl carbonate, trifluoromethyl methyl carbonate, bis(fluoromethyl) carbonate, bis(difluoromethyl) carbonate, bis(trifluoromethyl) carbonate, fluoromethyl ethyl carbonate, difluoromethyl ethyl carbonate, trifluoromethyl ethyl carbonate, fluoroethyl ethyl carbonate, difluoroethyl ethyl carbonate, trifluoroethyl ethyl carbonate, tetrafluoroethyl ethyl carbonate, pentafluoroethyl ethyl carbonate, hexafluoroethylene ethyl carbonate, bis(fluoroethyl) carbonate, bis(difluoroethyl) carbonate, bis(trifluoroethyl) carbonate, bis(tetrafluoroethyl) carbonate, bis(pentafluoroethyl) carbonate, bis(hexafluoroethyl) carbonate, vinyl carbonate, ethylene carbonate, propylene carbonate, 1,2-butylene carbonate, trans-butylene carbonate, fluoroethylene carbonate, difluoroethylene carbonate, trifluoroethylene carbonate, tetrafluoroethylene carbonate, chloroethylene carbonate, dichloroethylene carbonate, trichloroethylene carbonate, tetrachloroethylene carbonate, fluoromethyl ethylene carbonate, difluoromethyl ethylene carbonate, trifluoromethyl ethylene carbonate, bis(fluoromethyl)ethylene carbonate, bis(difluoromethyl)ethylene carbonate, bis(trifluoromethyl)ethylene carbonate, methyl propyl ether, methyl butyl ether, diethyl ether, ethyl propyl ether, ethyl butyl ether, dipropyl ether, propyl butyl ether, dibutyl ether, ethyl vinyl ether, divinyl ether, glyme, diglyme, triglyme, tetraglyme, 1,1,2,2-Tetrafluoro-3-(1,1,2,2-tetrafluoroethoxy)-propane, trifluoro(trifluoromethoxy) methane, perfluoroethyl ether, fluoromethyl methyl ether, difluoromethyl methyl ether, trifluoromethyl methyl ether, bis(fluoromethyl) ether, bis(difluoromethyl) ether, fluoroethyl methyl ether, difluoroethyl methyl ether, trifluoroethyl methyl ether, bis(fluoroethyl) ether, bis(difluoroethyl) ether, bis(trifluoroethyl) ether, 2-fluoroethoxymethoxyethane, 2,2 difluoroethoxymethoxyethane, methoxy-2,2,2-trifluoroethoxyethane, ethoxy-2-fluoroethoxyethane, 2,2-difluoroethoxyethoxyethane, ethoxy-2,2,2-trifluorocthoxyethane, methyl nonafluorobutyl ether, ethyl nonafluorobutyl ether, 2 fluoroethoxymethoxyethane, 2,2-difluorocthoxymethoxyethane, methoxy 2,2,2 trifluoroethoxyethane, ethoxy-2-fluoroethoxyethane, 2,2-difluoroethoxyethoxyethane, ethoxy 2,2,2-trifluorocthoxyethane, bis(trifluoro)methyl ether, dimethylether, methyl ethyl ether, methyl vinyl ether, perfluoromethyl-vinylether, propylene oxide, tetrahydrofuran, tetrahydropyran, furan, 12-crown-4,12-crown-5,18-crown-6,2-Methyltetrahydrofuran, 1,3-Dioxolane, 1,4-dioxolane, 2-methyloxolane, (1,2-propylene oxide), ethylene oxide, octafluorotetrahydrofuran, acetonitrile, propionitrile, butanenitrile, pentanenitrile, hexanenitrile, hexanedinitrile, pentanedinitrile, butanedinitrile, propanedinitrile, ethanedinitrile, isovaleronitrile, benzonitrile, phenylacetonitrile, cyanogen chloride, hydrogen cyanide, ethanedinitrile, trimethylphosphate, triethylphosphate, isomers thereof, and any combination thereof.

In an exemplary electrochemical device using a liquefied gas electrolyte composed of one or more liquefied gas components with any combination of one or more liquid components, one or more solid components, or one or more salt components, the electrodes are composed of any combination of two electrodes of intercalation type such as graphite, carbon, activated carbon, vanadium oxide, lithium titanate, titanium disulfide, molybdenum disulfide, lithium iron phosphate, lithium cobalt phosphate, lithium nickel phosphate, lithium cobalt oxide, lithium nickel manganese oxide, lithium nickel manganese cobalt oxide, lithium nickel cobalt aluminum oxide, carbon, or chemical reaction electrode such as with chemicals of sulfur, oxygen, carbon dioxide, nitrogen, nitrous oxide, sulfur dioxide, thionyl fluoride, thionyl chloride fluoride, sulfuryl fluoride, sulfuryl chloride fluoride, or electrostatic electrode using a high surface area electrically conducting material such as activated carbon, carbon black, carbon nanotubes, graphene, or of a metallic electrode with lithium, sodium, magnesium, tin, aluminum, calcium, titanium zinc metal or metal alloy including lithium, sodium, tin, magnesium, aluminum, calcium, titanium, zinc, or any combination thereof. These components may be combined with various binder polymer components, including polyvinylidene fluoride, carboxymethyl cellulose, styrene-butadiene rubber, or polytetrafluoroethylene in order to maintain structural integrity of the electrode.

In an exemplary example, the electrochemical device is partly comprised of a positive electrode, a negative electrode, electrically insulating separator, and an ionically conductive electrolyte. The positive and negative electrodes are comprised in part of an electrochemically active material, an electrically conductive material, and a binder which is often coated onto a metal foil which acts as metallic substrate. The coated electrodes and separator assembly are often held together by tape materials and then wetted by an ionically conductive electrolyte material.

The invention claimed is:

1. An electrochemical cell comprising:
   a positive electrode;
   a negative electrode;
   a separator disposed between the positive electrode and the negative electrode;
   a liquefied gas electrolyte in contact with the positive electrode, the negative electrode, and the separator;
   a tape securing at least a portion of an assembly comprising the positive electrode, the negative electrode, and the separator; the tape being in direct contact with the liquefied gas electrolyte; and
   wherein:
      the tape comprises a carrier selected from the group consisting of polyimide, polypropylene, polyethylene, and combinations thereof, and an acrylic adhesive; and
      securing the assembly with the tape prevents adhesive dissolution detectable by FTIR after 48 hours in the liquefied gas electrolyte.

2. The electrochemical cell of claim 1, wherein the acrylic adhesive comprises poly(methyl methacrylate).

3. The electrochemical cell of claim 1, wherein the liquefied gas electrolyte comprises at least one liquefied gas solvent selected from the group consisting of difluoromethane, fluoromethane, trifluoromethane, 1,1-difluoroethylene, fluoroethylene, 1,1,2-trifluoroethylene, tetrafluoroethylene, vinyl fluoride, 1-fluoro-1-chloro-ethane, 1-fluoro-2-chloroethane, carbon dioxide, carbon disulfide, carbonyl sulfide, sulfur dioxide, thionyl fluoride, thionyl chloride fluoride, sulfuryl fluoride, sulfuryl chloride fluoride, phosphoryl chloride difluoride, phosphorus oxychloride, nitryl fluoride, nitrous oxide, nitrogen dioxide, nitrous difluoride, nitrogen trifluoride, cyanogen fluoride, cyanogen chloride, cyanogen bromide, cyanogen, hydrogen cyanide, hydrogen fluoride, hydrogen chloride, hydrogen bromide, isomers thereof, and combinations thereof.

4. The electrochemical cell of claim 1, wherein the liquefied gas electrolyte comprises at least one salt selected from the group consisting of lithium salts, sodium salts, potassium salts, magnesium salts, calcium salts, aluminum salts, tetrabutylammonium salts, tetraethylammonium salts, methyltriethylammonium salts, trimethylammonium salts, and combinations thereof, with anions selected from the group consisting of acetate, bis(fluorosulfonyl)imide, bis (oxalato)borate, bis(trifluoromethanesulfonyl)imide, bromide, chloride, dicyanamide, diethyl phosphate, hexafluorophosphate, hydrogen sulfate, iodide, methanesulfonate, methylphosphonate, tetrachloroaluminate, tetrafluoroborate, trifluoromethanesulfonate, isomers thereof, and combinations thereof.

5. The electrochemical cell of claim 1, wherein the liquefied gas electrolyte further comprises at least one additive selected from the group consisting of dimethyl carbonate, ethyl methyl carbonate, propylene carbonate, ethylene carbonate, diethyl ether, tetrahydrofuran, acetonitrile, trimethylphosphate, isomers thereof, and combinations thereof.

6. The electrochemical cell of claim 1, wherein the positive electrode or the negative electrode comprises an electrochemically active material selected from the group consisting of graphite, lithium iron phosphate, lithium cobalt oxide, lithium nickel manganese cobalt oxide, sulfur, oxygen, activated carbon, lithium metal, sodium metal, and combinations thereof.

7. The electrochemical cell of claim 1, wherein the tape securing the assembly is configured to electrically isolate an electrode tab.

8. The electrochemical cell of claim 1, wherein the tape maintains at least 90% tensile strength after exposure to the liquefied gas electrolyte for 48 hours at 25° C.

9. The electrochemical cell of claim 1, wherein the electrochemical cell is a battery.

10. The electrochemical cell of claim 9, wherein the battery is a cylindrical battery.

11. A method of assembling an electrochemical cell, comprising:

providing a positive electrode, a negative electrode, and a separator;

forming an assembly by disposing the separator between the positive electrode and the negative electrode;

securing at least a portion of the assembly with a tape, wherein the tape comprises a carrier selected from the group consisting of polyimide, polypropylene, polyethylene, and combinations thereof, and an acrylic adhesive; and contacting the assembly with a liquefied gas electrolyte.

12. The method of claim 11, wherein the acrylic adhesive comprises poly(methyl methacrylate).

13. The method of claim 11, wherein the liquefied gas electrolyte comprises at least one liquefied gas solvent selected from the group consisting of difluoromethane, fluoromethane, trifluoromethane, 1,1-difluoroethylene, fluoroethylene, 1,1,2-trifluoroethylene, tetrafluoroethylene, vinyl fluoride, 1-fluoro-1-chloro-ethane, 1-fluoro-2-chloroethane, carbon dioxide, carbon disulfide, carbonyl sulfide, sulfur dioxide, thionyl fluoride, thionyl chloride fluoride, sulfuryl fluoride, sulfuryl chloride fluoride, phosphoryl chloride difluoride, phosphorus oxychloride, nitryl fluoride, nitrous oxide, nitrogen dioxide, nitrous difluoride, nitrogen trifluoride, cyanogen fluoride, cyanogen chloride, cyanogen bromide, cyanogen, hydrogen cyanide, hydrogen fluoride, hydrogen chloride, hydrogen bromide, isomers thereof, and combinations thereof.

14. The method of claim 11, wherein the liquefied gas electrolyte comprises at least one salt selected from the group consisting of lithium salts, sodium salts, potassium salts, magnesium salts, calcium salts, aluminum salts, tetrabutylammonium salts, tetraethylammonium salts, methyltriethylammonium salts, trimethylammonium salts, and combinations thereof, with anions selected from the group consisting of acetate, bis(fluorosulfonyl)imide, bis(oxalato) borate, bis(trifluoromethanesulfonyl)imide, bromide, chloride, dicyanamide, diethyl phosphate, hexafluorophosphate, hydrogen sulfate, iodide, methanesulfonate, methylphosphonate, tetrachloroaluminate, tetrafluoroborate, trifluoromethanesulfonate, isomers thereof, and combinations thereof.

15. The method of claim 11, wherein the liquefied gas electrolyte further comprises at least one additive selected from the group consisting of dimethyl carbonate, ethyl methyl carbonate, propylene carbonate, ethylene carbonate, diethyl ether, tetrahydrofuran, acetonitrile, trimethylphosphate, isomers thereof, and combinations thereof.

16. The method of claim 11, wherein the positive electrode or the negative electrode comprises an electrochemically active material selected from the group consisting of graphite, lithium iron phosphate, lithium cobalt oxide, lithium nickel manganese cobalt oxide, sulfur, oxygen, activated carbon, lithium metal, sodium metal, and combinations thereof.

17. The method of claim 11, wherein securing the assembly with the tape prevents dissolution of the tape in the liquefied gas electrolyte.

18. The method of claim 11, further comprising electrically isolating an electrode tab with the tape securing the assembly.

19. An electrochemical cell comprising:

a jelly roll assembly including a positive electrode, a negative electrode, and a separator wound together;

a liquefied gas electrolyte;

a tape securing the jelly roll assembly, the tape being in direct contact with the liquefied gas electrolyte, wherein the tape comprises a carrier selected from the group consisting of polyimide, polypropylene, polyethylene, and combinations thereof, and an acrylic adhesive; and wherein:

the tape exhibits chemical stability in the liquefied gas electrolyte; and securing the assembly with the tape prevents adhesive dissolution detectable by FTIR after 48 hours in the liquefied gas electrolyte.

20. The electrochemical cell of claim 19, wherein the acrylic adhesive comprises poly(methyl methacrylate).

21. The electrochemical cell of claim 19, wherein the liquefied gas electrolyte comprises at least one liquefied gas solvent selected from the group consisting of difluoromethane, fluoromethane, trifluoromethane, 1,1-difluoroethylene, fluoroethylene, 1,1,2-trifluoroethylene, tetrafluoroethylene, vinyl fluoride, 1-fluoro-1-chloro-ethane, 1-fluoro-2-chloroethane, carbon dioxide, carbon disulfide, carbonyl sulfide, sulfur dioxide, thionyl fluoride, thionyl chloride fluoride, sulfuryl fluoride, sulfuryl chloride fluoride, phosphoryl chloride difluoride, phosphorus oxychloride, nitryl fluoride, nitrous oxide, nitrogen dioxide, nitrous difluoride, nitrogen trifluoride, cyanogen fluoride, cyanogen chloride, cyanogen bromide, cyanogen, hydrogen cyanide, hydrogen fluoride, hydrogen chloride, hydrogen bromide, isomers thereof, and combinations thereof.

22. The electrochemical cell of claim 19, wherein the liquefied gas electrolyte comprises at least one salt selected from the group consisting of lithium salts, sodium salts, potassium salts, magnesium salts, calcium salts, aluminum salts, tetrabutylammonium salts, tetraethylammonium salts, methyltriethylammonium salts, trimethylammonium salts, and combinations thereof, with anions selected from the group consisting of acetate, bis(fluorosulfonyl)imide, bis (oxalato)borate, bis(trifluoromethanesulfonyl)imide, bromide, chloride, dicyanamide, diethyl phosphate, hexafluorophosphate, hydrogen sulfate, iodide, methanesulfonate, methylphosphonate, tetrachloroaluminate, tetrafluoroborate, trifluoromethanesulfonate, isomers thereof, and combinations thereof.

23. The electrochemical cell of claim 19, wherein the liquefied gas electrolyte further comprises at least one additive selected from the group consisting of dimethyl carbonate, ethyl methyl carbonate, propylene carbonate, ethylene carbonate, diethyl ether, tetrahydrofuran, acetonitrile, trimethylphosphate, isomers thereof, and combinations thereof.

24. The electrochemical cell of claim 19, wherein the positive electrode or the negative electrode comprises an electrochemically active material selected from the group consisting of graphite, lithium iron phosphate, lithium cobalt oxide, lithium nickel manganese cobalt oxide, sulfur, oxygen, activated carbon, lithium metal, sodium metal, and combinations thereof.

25. The electrochemical cell of claim 19, wherein the tape securing the assembly is configured to electrically isolate an electrode tab.

26. The electrochemical cell of claim 19, wherein the tape maintains mechanical integrity after exposure to the liquefied gas electrolyte at 25° C. for 48 hours.

27. The electrochemical cell of claim 19, wherein the electrochemical cell is a battery.

28. The electrochemical cell of claim 27, wherein the battery is a cylindrical battery.

\*  \*  \*  \*  \*